:

US010558483B2

(12) United States Patent
Balma et al.

(10) Patent No.: US 10,558,483 B2
(45) Date of Patent: Feb. 11, 2020

(54) OPTIMAL DYNAMIC PLACEMENT OF VIRTUAL MACHINES IN GEOGRAPHICALLY DISTRIBUTED CLOUD DATA CENTERS

(71) Applicants: International Business Machines Corporation, Armonk, NY (US); University of Tunis El-Manar, Tunis (TN)

(72) Inventors: Ali Balma, Tunis (TN); Nejib Ben Hadj-Alouane, Tunis (TN); Aly Megahed, San Jose, CA (US); Mohamed Mohamed, San Jose, CA (US); Samir Tata, Cupertino, CA (US); Hana Teyeb, Tunis (TN)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 15/493,034

(22) Filed: Apr. 20, 2017

(65) Prior Publication Data
US 2018/0307512 A1    Oct. 25, 2018

(51) Int. Cl.
*G06F 9/455*    (2018.01)
*G06F 9/50*    (2006.01)

(52) U.S. Cl.
CPC .. *G06F 9/45558* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| 7,925,923 | B1 | 4/2011 | Hyser et al. |
| 8,102,781 | B2 | 1/2012 | Smith |
| 9,292,329 | B2 | 3/2016 | Sanghvi et al. |
| 2018/0210766 | A1* | 7/2018 | Beyh .................. H04L 41/0886 |

OTHER PUBLICATIONS

Vu et al., "A Traffic and Power-aware Algorithm for Virtual Machine Placement in Cloud Data Center," International Journal of Grid and Distributed Computing, vol. 7, No. 1, 2014, pp. 21-32.

(Continued)

*Primary Examiner* — Eric C Wai
(74) *Attorney, Agent, or Firm* — Zilka-Kotab, P.C.

(57) ABSTRACT

A computer-implemented method according to one embodiment includes identifying a set of virtual machines to be placed within a system, receiving characteristics associated with the set of virtual machines, determining characteristics associated with a current state of the system, determining a placement of the set of virtual machines within the system, based on the characteristics associated with the set of virtual machines and the characteristics associated with a current state of the system, determining an updated placement of all virtual machines currently placed within the system, based on the characteristics associated with the set of virtual machines and the characteristics associated with a current state of the system, and determining a migration sequence within the system in order to implement the updated placement of all virtual machines currently placed within the system.

13 Claims, 9 Drawing Sheets

(56) References Cited

OTHER PUBLICATIONS

Cohen et al., "Almost Optimal Virtual Machine Placement for Traffic Intense Data Centers," Proceedings IEEE INFOCOM, 2013, pp. 355-359.
Barabash et al. "A Case for Overlays in DCN Virtualization," Proceedings of the 3rd Workshop on Data Center-Converged and Virtual Ethernet Switching, International Teletraffic Congress, 2011, pp. 30-37.
Rehman et al., "VOtus: A Flexible and Scalable Monitoring Framework for Virtualized Clusters," Proceedings of the 3rd International Conference on Cloud Computing and Science, CloudCom, 2011, pp. 1-4.
Piao et al., "A Network-aware Virtual Machine Placement and Migration Approach in Cloud Computing," 2010 Ninth International Conference on Grid and Cloud Computing, IEEE, 2010, pp. 87-92.
Bose et al., "Optimizing Migration of Virtual Machines across Data-Centers." 2009 International Conference on Parallel Processing Workshops, IEEE, 2009, pp. 306-313.
Ruan et al., "Performance-to-Power Ratio Aware Virtual Machine (VM) Allocation in Energy-Efficient Clouds," IEEE International Conference on Cluster Computing, 2015, pp. 1-10.
NIST, "NIST Cloud Computing Program," Information Technology Laboratory, retrieved from http://www.nist.gov/itl/cloud/, Nov. 2013, pp. 1-2.
Mell et al., "The NIST Definition of Cloud Computing," Version 15, Oct. 2009, pp. 1-2.
Mell et al., "The NIST Definition of Cloud Computing," National Institute of Standards and Technology, Special Publication 800-145, Sep. 2011, pp. 1-7.
Mann et al, "Remedy: Network-aware steady state VM management for data centers," Networking, 2012, pp. 190-204.
Bradford et al., "Live Wide-Area Migration of Virtual Machines Including Local Persistent State," VEE '07, ACM, Jun. 13-15, 2007, pp. 1-11.
Voorsluys et al., "Cost of Virtual Machine Live Migration in Clouds: A Performance Evaluation," CoRR, vol. abs/1109.4974, 2011, pp. 1-12.
Mishra et al., "Dynamic Resource Management Using Virtual Machine Migrations," Cloud Computing: Networking and Communications Challenges, IEEE Communications Magazine, Sep. 2012, pp. 34-40.
IBM, "CPLEX Optimizer," retrieved from www.ilog.com/products/cplex/, Apr. 2013, pp. 1-3.
Calheiros et al., "CloudSim: a toolkit for modeling and simulation of cloud computing environments and evaluation of resource provisioning algorithms," Software: Practice and Experience, vol. 41, Aug. 2010, pp. 23-50.
Amazon, "Amazon EC2," retrieved from aws.amazon.com/ec2, May 2014, pp. 1-5.
Benson et al., "Understanding Data Center Traffic Characteristics," ACM, WREN '09, Aug. 2009, pp. 65-72.
Kandula et al., "The Nature of Data Center Traffic: Measurements & Analysis," Proceedings of the 9th ACM SIGCOMM conference on Internet Measurement Conference, Nov. 4-6, 2009, pp. 202-208.
Koto et al., "Towards Unobtrusive VM Live Migration for Cloud Computing Platforms," APSys '12, ACM, Jul. 23-24, 2012, pp. 1-6.
Lim et al., "Migration, Assignment, and Scheduling of Jobs in Virtualized Environment," 3rd USENIX Workshop on Hot Topics in Cloud Computing, HotCloud '11, 2011, pp. 1-5.
Amokrane et al., "Greenhead: Virtual Data Center Embedding Across Distributed Infrastructures," IEEE Transactions on Cloud Computing, vol. 1, No. 1, Jan.-Jun. 2013, pp. 1-14.
Zhang et al., "Dynamic Service Placement in Geographically Distributed Clouds," IEEE Journal on Selected Areas in Communications/Supplement, Part 2, vol. 31, No. 12, Dec. 2013, pp. 762-772.
Cloud Industry Forum, "UK cloud adoption and trends for 2013," Cloud UK, Paper eight, 2013, pp. 1-18.
Church et al., "On Delivering Embarrassingly Distributed Cloud Services," Hotnets, Oct. 2008, pp. 1-6.
Greenberg et al., "The Cost of a Cloud: Research Problems in Data Center Networks," ACM SIGCOMM Computer Communication Review, vol. 39, No. 1, Jan. 2009, pp. 68-73.
Teyeb et al., "Traffic-aware Virtual Machine Placement in Geographically Distributed Clouds," IEEE, 2014, pp. 1-6.
Beloglazov et al., "Optimal Online Deterministic Algorithms and Adaptive Heuristics for Energy and Performance Efficient Dynamic Consolidation of Virtual Machines in Cloud Data Centers," Concurrency and Computation: Practice and Experience, vol. 24, 2012, pp. 1-24.
Wood et al., "Cloudnet: Dynamic Pooling of Cloud Resources by Live WAN Migration of Virtual Machines," IEEE/ACM Transactions on Networking, vol. 23, No. 5, Oct. 2015, pp. 1568-1583.
Mills et al., "Comparing VM-Placement Algorithms for On-Demand Clouds," Third IEEE International Conference on Cloud Computing Technology and Science, 2011, pp. 91-98.
Goiri et al., "Intelligent Placement of Datacenters for Internet Services," Distributed Computing Systems (ICDCS), 2011, pp. 1-12.
Liu et al., "VMbuddies: Coordinating Live Migration of Multi-Tier Applications in Cloud Environments," IEEE Transactions on Parallel and Distributed Systems, vol. 26, No. 4, Apr. 2015, pp. 1192-1208.
Akiyama et al., "Fast Wide Area Live Migration with a Low Overhead through Page Cache Teleportation," 13th IEEE/ACM International Symposium on Cluster, Cloud and Grid Computing, May 2013, pp. 1-5.
Rego et al., "Traveling salesman problem heuristics: Leading methods, implementations and latest advances," European Journal of Operational Research, vol. 211, 2011, pp. 427-441.
Zhang et al., "Minimizing Communication traffic in Data Centers with Power-aware VM Placement," Sixth International Conference on Innovative Mobile and Internet Services in Ubiquitous Computing, IEEE, 2012, pp. 280-285.
Meng et al., "Improving the Scalability of Data Center Networks with Traffic-aware Virtual Machine Placement," IEEE INFOCOM, 2010, pp. 1-9.
Dias et al., "Online Traffic-aware Virtual Machine Placement in Data Center Networks," Global Information Infrastructure and Networking Symposium (GIIS), 2012, pp. 1-8.
Duong-Ba et al., "Joint Virtual Machine Placement and Migration Scheme for Datacenters," Global Communications Conference (GLOBECOM), IEEE, 2014, pp. 2320-2325.
Goudarzi et al., "Geographical Load Balancing for Online Service Applications in Distributed Datacenters," IEEE Sixth International Conference on Cloud Computing, 2013, pp. 351-358.
Kantarci et al., "Inter-and-Intra Data Center VM-Placement for Energy-Efficient Large-Scale Cloud Systems," Globecom Workshops, 2012, pp. 708-713.
Teyeb et al., "Optimal Virtual Machine Placement in Large-Scale Cloud Systems," IEEE International Conference on Cloud Computing, 2014, pp. 424-431.
Yapicioglu et al., "A Traffic-Aware Virtual Machine Placement Method for Cloud Data Centers," IEEE/ACM 6th International Conference on Utility and Cloud Computing, 2013, pp. 299-301.
Larumbe et al., "Optimal Location of Data Centers and Software Components in Cloud Computing Network Design," 12th IEEE/ACM International Symposium on Cluster, Cloud and Grid Computing, 2012, pp. 841-844.
Guan et al., "Topology and Migration-Aware Energy Efficient Virtual Network Embedding for Green Data Centers," IEEE ICCCN, 2014, pp. 1-8.
Solomon et al., "Designing Autonomic Management Systems for Cloud Computing," IEEE International Joint Conferences on Computational Cybernetics and Technical Informatics, May 2010, pp. 631-636.
Humane et al., "Simulation of Cloud Infrastructure using CloudSim Simulator: A Practical Approach for Researchers," International Conference on Smart Technologies and Management for Computing, Communication, Controls, Energy and Materials, May 2015, pp. 207-211.

(56) References Cited

OTHER PUBLICATIONS

Rodriguez-Martin et al., "Solving a capacitated hub location problem," European Journal of Operational Research, vol. 184, 2008, pp. 468-479.
Garey et al., "Computers and Intractability: A Guide to the Theory of NP-Completeness," W. H. Freeman & Co., 1979, 13 pages.
Miller et al., "Integer Programming Formulation of Traveling Salesman Problems," Journal of the ACM, vol. 7, No. 4, Oct. 1960, pp. 326-329.
Desrochers et al., "Improvements and extensions to the Miller-Tucker-Zemlin subtour elimination constraints," Operations Research Letters, vol. 10, Feb. 1991, pp. 27-36.
Shankar, A., "Virtual Machine Placement in Computing Clouds," Indian Institute of Technology Bombay, Apr. 10, 2010, 24 pages.
Balma et al., U.S. Appl. No. 16/674,977, filed Nov. 5, 2019.

\* cited by examiner

OPTIMAL DYNAMIC PLACEMENT OF VIRTUAL MACHINES IN GEOGRAPHICALLY DISTRIBUTED CLOUD DATA CENTERS

BACKGROUND

The present invention relates to virtual machines, and more specifically, this invention relates to optimal placement and migration of virtual machines within cloud data centers.

Cloud computing has emerged as a new paradigm where tenants can benefit from on-demand computing resources provided in a pay-as-you-go manner. In IaaS environments, tenants may benefit from computing resources such as processing, memory, storage and networking. In order to achieve reliability and serve world-wide users, large-scale IaaS providers are relying on a geographically distributed infrastructure where data centers (DCs) are built in different locations and interconnected by a backbone network.

With the rise of cloud services popularity, many virtual machines (VMs) are now hosting applications with critical network requirements, and therefore may need to be placed in a predetermined proximity of end-users in order to maintain service performance (especially for latency-sensitive applications). In addition, for many applications, the amount of traffic generated by service communication and data exchange may have an influence on the performance of the whole system. Further, VM migration may entail a large amount of traffic, which adds to the traffic generated by intercommunicating VMs.

SUMMARY

A computer-implemented method according to one embodiment includes identifying a set of virtual machines to be placed within a system, receiving characteristics associated with the set of virtual machines, determining characteristics associated with a current state of the system, determining a placement of the set of virtual machines within the system, based on the characteristics associated with the set of virtual machines and the characteristics associated with a current state of the system, determining an updated placement of all virtual machines currently placed within the system, based on the characteristics associated with the set of virtual machines and the characteristics associated with a current state of the system, and determining a migration sequence within the system in order to implement the updated placement of all virtual machines currently placed within the system.

According to another embodiment, a computer program product for optimal dynamic virtual machine placement in geographically distributed cloud data centers comprises a computer readable storage medium having program instructions embodied therewith, where the computer readable storage medium is not a transitory signal per se, and where the program instructions are executable by a processor to cause the processor to perform a method comprising identifying a set of virtual machines to be placed within a system, utilizing the processor, receiving characteristics associated with the set of virtual machines, utilizing the processor, determining characteristics associated with a current state of the system, utilizing the processor, determining a placement of the set of virtual machines within the system, based on the characteristics associated with the set of virtual machines and the characteristics associated with a current state of the system, utilizing the processor, determining an updated placement of all virtual machines currently placed within the system, based on the characteristics associated with the set of virtual machines and the characteristics associated with a current state of the system, utilizing the processor, and determining a migration sequence within the system in order to implement the updated placement of all virtual machines currently placed within the system, utilizing the processor.

A system according to another embodiment includes a processor, and logic integrated with the processor, executable by the processor, or integrated with and executable by the processor, the logic being configured to identify a set of virtual machines to be placed within a system, receive characteristics associated with the set of virtual machines, determine characteristics associated with a current state of the system, determine a placement of the set of virtual machines within the system, based on the characteristics associated with the set of virtual machines and the characteristics associated with a current state of the system, determine an updated placement of all virtual machines currently placed within the system, based on the characteristics associated with the set of virtual machines and the characteristics associated with a current state of the system, and determine a migration sequence within the system in order to implement the updated placement of all virtual machines currently placed within the system.

Other aspects and embodiments of the present invention will become apparent from the following detailed description, which, when taken in conjunction with the drawings, illustrate by way of example the principles of the invention.

DETAILED DESCRIPTION

Figure 1:
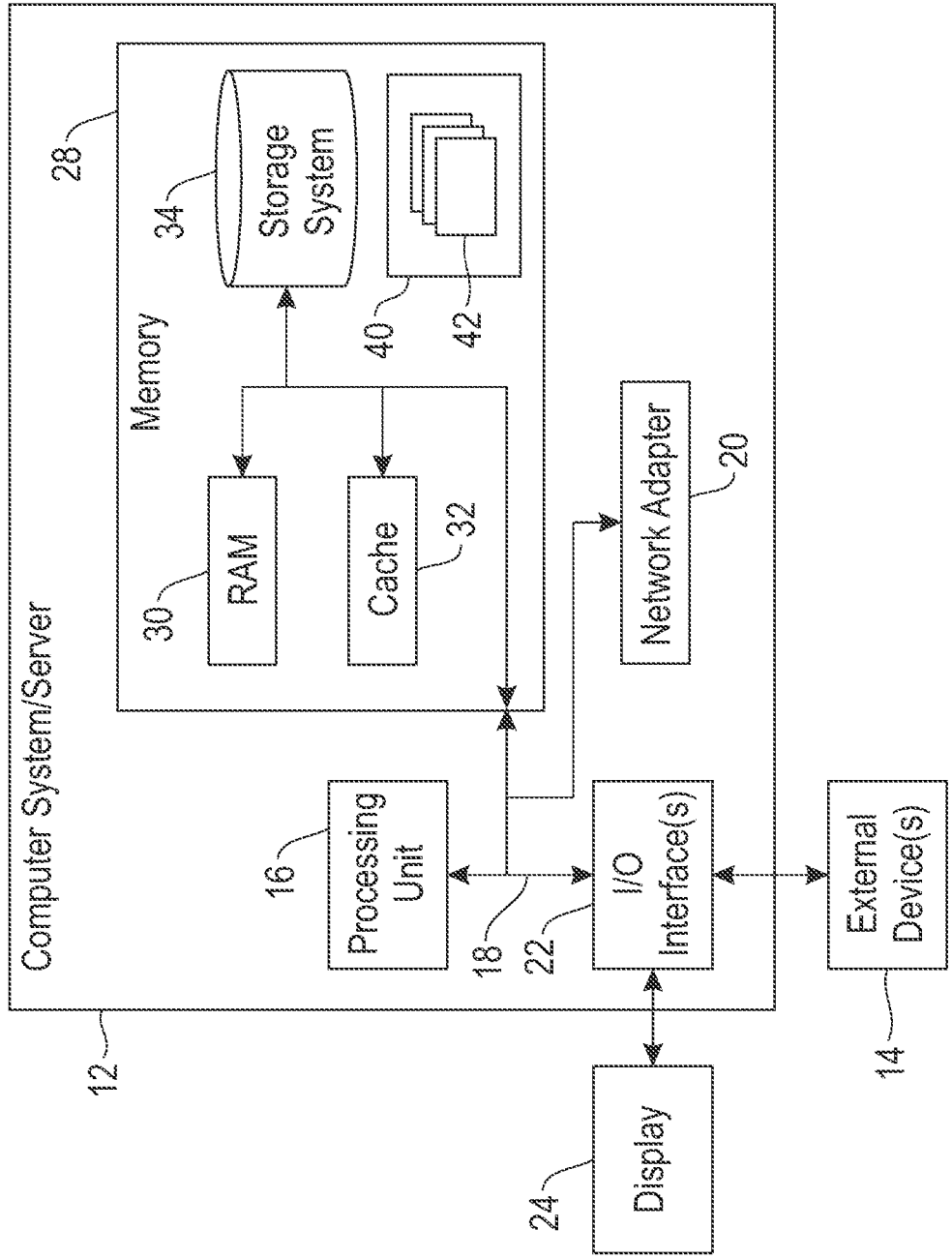
FIG. 1 depicts a cloud computing node according to an embodiment of the present invention.

The following description discloses several preferred embodiments of systems, methods and computer program products for optimal dynamic placement of virtual machines in geographically distributed cloud data centers. Various embodiments provide a method for analyzing characteristics of a current state of a system, as well as characteristics of desired changes to the system, and optimizing virtual machine placement and migration, utilizing those characteristics.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for optimal dynamic placement of virtual machines in geographically distributed cloud data centers.

In one general embodiment, a computer-implemented method includes identifying a set of virtual machines to be placed within a system, receiving characteristics associated with the set of virtual machines, determining characteristics associated with a current state of the system, determining a placement of the set of virtual machines within the system, based on the characteristics associated with the set of virtual machines and the characteristics associated with a current state of the system, determining an updated placement of all virtual machines currently placed within the system, based on the characteristics associated with the set of virtual machines and the characteristics associated with a current state of the system, and determining a migration sequence within the system in order to implement the updated placement of all virtual machines currently placed within the system.

In another general embodiment, a computer program product for optimal dynamic virtual machine placement in geographically distributed cloud data centers comprises a computer readable storage medium having program instructions embodied therewith, where the computer readable storage medium is not a transitory signal per se, and where the program instructions are executable by a processor to cause the processor to perform a method comprising identifying a set of virtual machines to be placed within a system, utilizing the processor, receiving characteristics associated with the set of virtual machines, utilizing the processor, determining characteristics associated with a current state of the system, utilizing the processor, determining a placement of the set of virtual machines within the system, based on the characteristics associated with the set of virtual machines and the characteristics associated with a current state of the system, utilizing the processor, determining an updated placement of all virtual machines currently placed within the system, based on the characteristics associated with the set of virtual machines and the characteristics associated with a current state of the system, utilizing the processor, and determining a migration sequence within the system in order to implement the updated placement of all virtual machines currently placed within the system, utilizing the processor.

In another general embodiment, a system includes a processor, and logic integrated with the processor, executable by the processor, or integrated with and executable by the processor, the logic being configured to identify a set of virtual machines to be placed within a system, receive characteristics associated with the set of virtual machines, determine characteristics associated with a current state of the system, determine a placement of the set of virtual machines within the system, based on the characteristics associated with the set of virtual machines and the characteristics associated with a current state of the system, determine an updated placement of all virtual machines currently placed within the system, based on the characteristics associated with the set of virtual machines and the characteristics associated with a current state of the system, and determine a migration sequence within the system in order to implement the updated placement of all virtual machines currently placed within the system.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
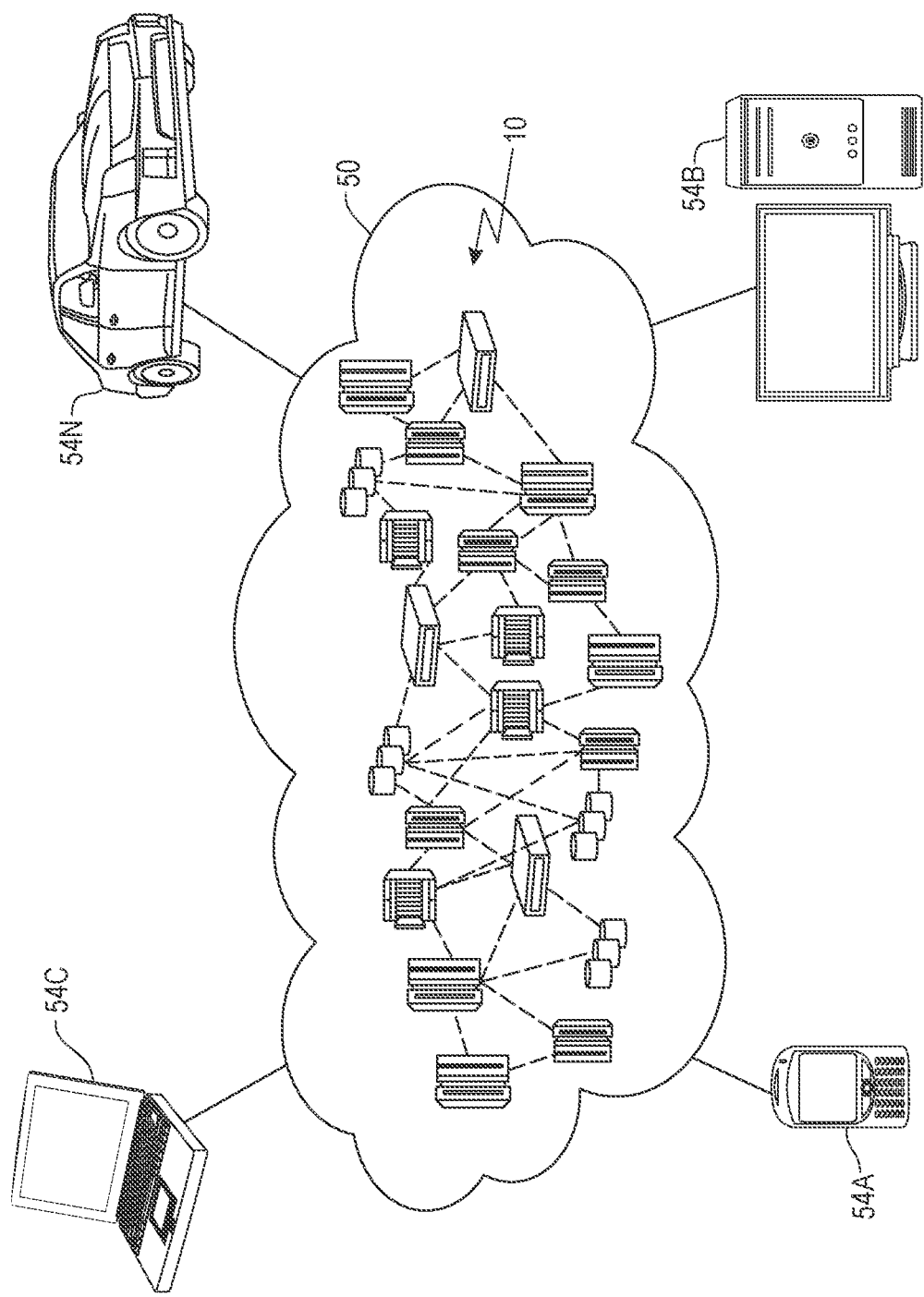
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
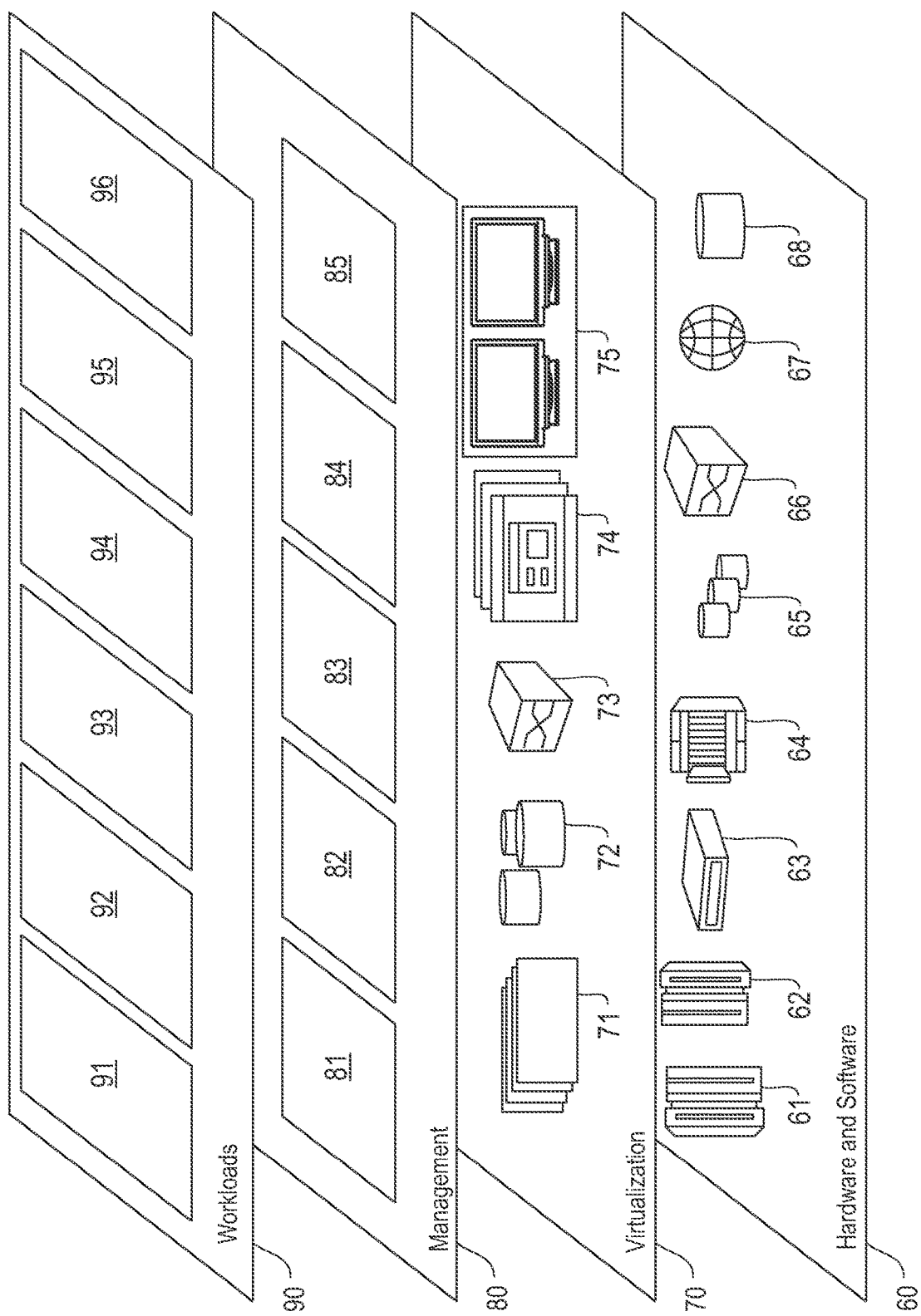
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual machine storage and management 96.

Figure 4:
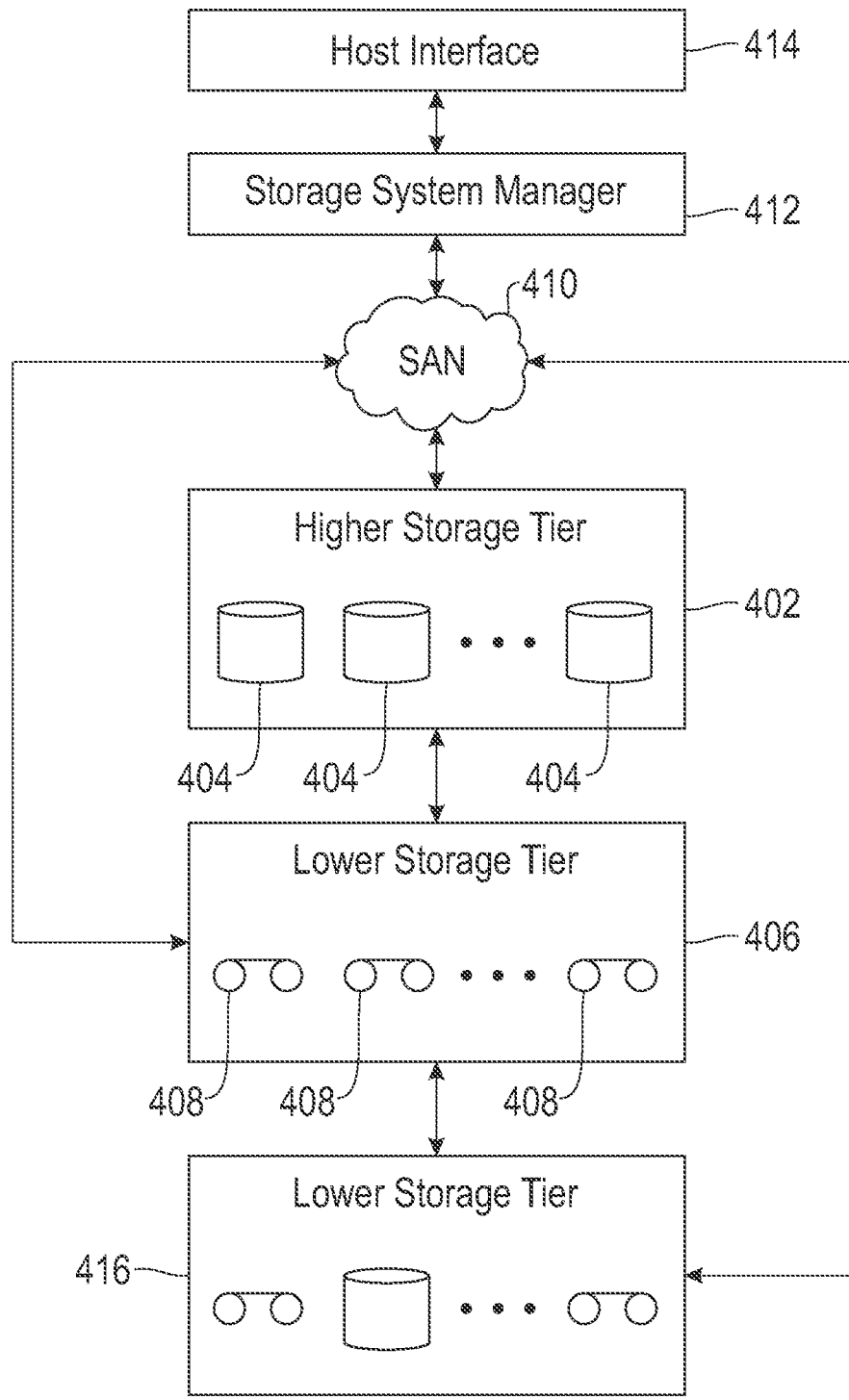
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
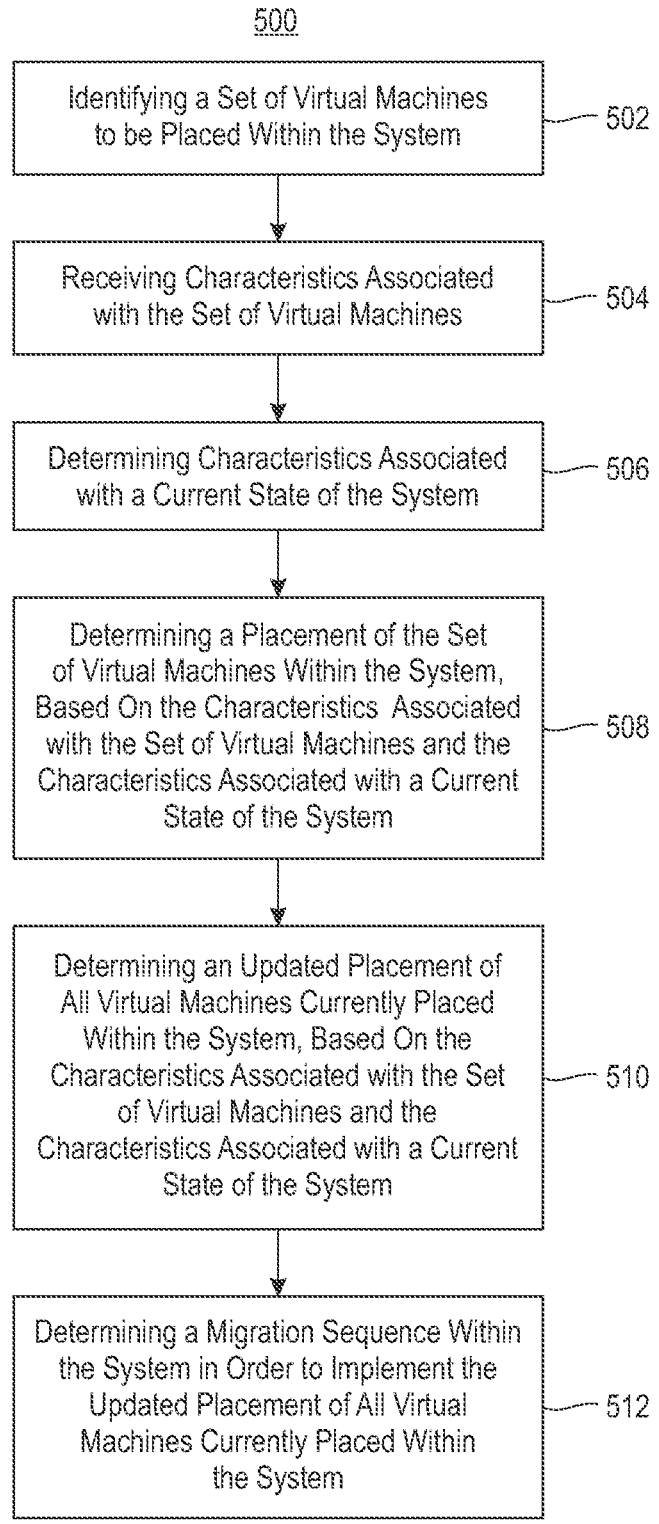
FIG. 5 illustrates a flowchart of a method for optimal dynamic placement of virtual machines in geographically distributed cloud data centers, in accordance with one embodiment.

Now referring to FIG. 5, a flowchart of a method 500 is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a set of virtual machines (VMs) to be placed within a system is identified. In one embodiment, the set may include one or more virtual machines not currently stored within the system. In another embodiment, the system may include a cloud computing environment. In yet another embodiment, the system may include an infrastructure as a system (IaaS) system. For example, the system may include an IaaS system that provides virtualized computing resources such as processing, memory, storage, networking, etc.

Additionally, in one embodiment, the system may include a cloud-based storage network. For example, the system may include a cloud-based storage network including a plurality of data centers connected utilizing a backbone network. In another example, the data centers may be geographically distributed. For instance, the data centers may be physically located in different locations and interconnected by the backbone network.

Further, in one embodiment, the set of virtual machines may be included in a request to place the set of virtual machines within the system. In another embodiment, the identifying may be performed by a cloud monitor module within the system. In yet another embodiment, placing a virtual machine within a system may include storing data associated with the virtual machine at one or more data centers within the system, allowing the virtual machine to access one or more resources of one or more data centers within the system, etc.

Further still, method 500 may proceed with operation 504, where characteristics associated with the set of virtual machines are received. In one embodiment, the characteristics associated with the set of virtual machines may include resource utilization for each virtual machine within the set of virtual machines. For example, the resource utilization may include one or more of central processing unit (CPU) utilization, random access memory (RAM) utilization, storage utilization, network utilization, etc. In another embodiment, the characteristics may include may also include a maximum latency allowed by a virtual machine.

Also, in one embodiment, the characteristics associated with the set of virtual machines may include one or more location constraints. For example, the characteristics associated with the set of virtual machines may include user-provided limitations on a physical location (e.g., a physical data center, etc.) where one or more of the virtual machines within the set of virtual machines may be physically stored. In another embodiment, the characteristics associated with the set of virtual machines may include a traffic matrix for the set of virtual machines. For example, the traffic matrix may describe network traffic that occurs between each virtual machine within the set of virtual machines. In yet another embodiment, the characteristics associated with the set of virtual machines may be included in the request to place the set of virtual machines within the system.

In addition, method 500 may proceed with operation 506, where characteristics associated with a current state of the system are determined. In one embodiment, the characteristics associated with the current state of the system may include a capacity of each data center within the system. For example, the capacity may include a listing of available resources (e.g., CPU resource, RAM resources, storage resources, etc.) at each data center. In another embodiment, the characteristics associated with the current state of the system may include a current utilization of the capacity of each data center. For example, the characteristics associated with the current state of the system may include a current utilization of the capacity of each data center by one or more virtual machines currently placed within the system.

Furthermore, in one embodiment, the characteristics associated with the current state of the system may include a current placement of all of the virtual machines currently placed within the system. For example, the characteristics associated with the current state of the system may include a current placement of the virtual machines within one or more data centers within the system. In another embodiment, the characteristics associated with the current state of the system may include a global traffic matrix. For example, the global traffic matrix may describe network traffic that occurs between all virtual machines currently placed within the system. In yet another embodiment, the characteristics associated with the current state of the system may be identified by monitoring resources within the system (e.g., utilizing the cloud monitor module within the system, etc.).

Further still, method 500 may proceed with operation 508, where a placement of the set of virtual machines within the system is determined, based on the characteristics associated with the set of virtual machines and the characteristics associated with a current state of the system. In one embodiment, the placement may include a location (e.g., a data center, etc.) within the system where a virtual machine is to be placed (e.g., stored, etc.). In another embodiment, the placement of the set of virtual machines within the system may minimize an amount of communication traffic on a backbone network of the system, while still enabling the characteristics associated with the set of virtual machines.

Also, method 500 may proceed with operation 510, where an updated placement of all virtual machines currently placed within the system is determined, based on the characteristics associated with the set of virtual machines and the characteristics associated with a current state of the system. In one embodiment, the updated placement may be determined utilizing a mixed integer linear optimization mathematical model. In another embodiment, the updated placement of all virtual machines currently placed within the system may minimize an amount of communication traffic on a backbone network of the system, while still enabling one or more of the characteristics associated with the current state of the system.

Additionally, method 500 may proceed with operation 512, where a migration sequence within the system is determined in order to implement the updated placement of all virtual machines currently placed within the system. In one embodiment, the migration sequence may indicate an order of one or more movements of all virtual machines currently placed within the system (e.g., from one data center within the system to another data center within the system). In another embodiment, the migration of a virtual machine from a first data center to a second data center may include movement of both memory and disk state snapshots from the first data center to the second data center.

Further, in one embodiment, the placement of the set of virtual machines within the system, the updated placement of all virtual machines currently placed within the system, and the migration sequence are all optimized utilizing one or more optimization models. For example, the migration sequence may be determined utilizing one or more of a linear optimization mathematical model and a heuristic solution method. In another embodiment, the updated placement and the migration sequence may be determined simultaneously. In yet another embodiment, the migration sequence may minimize an amount of communication traffic on a backbone network of the system while implementing the updated placement of all virtual machines currently placed within the system. In yet another embodiment, the placement of the set of virtual machines within the system, the updated placement of all virtual machines currently placed within the system, and the migration sequence may be all optimized and determined simultaneously.

Further still, in one embodiment, the updated placement may be implemented, utilizing the migration sequence. For example, the updated placement may be performed using one or more migration mechanisms provided by a manager of the system. In another embodiment, the updated placement of all virtual machines currently placed within the system may be determined in response to one or more events. For example, the one or more events may include a removal of one or more virtual machines from the system. In another example, the one or more events may include a determination that a current amount of communication traffic within the system exceeds a predetermined threshold. In yet another example, the updated placement may be determined utilizing the characteristics associated with the current state of the system. In yet another embodiment, the migration sequence may be implemented using migration mechanisms provided by an infrastructure as a service (IaaS) manager. In another embodiment, the placement of the set of virtual machines within the system may be performed using an IaaS manager application program interface (API).

In this way, the migration may minimize communication traffic between virtual machines placed at data centers within the system. Simultaneously, network traffic (e.g., traffic over a backbone network of the system) caused during the migration may be minimized.

System Model

Figure 6:
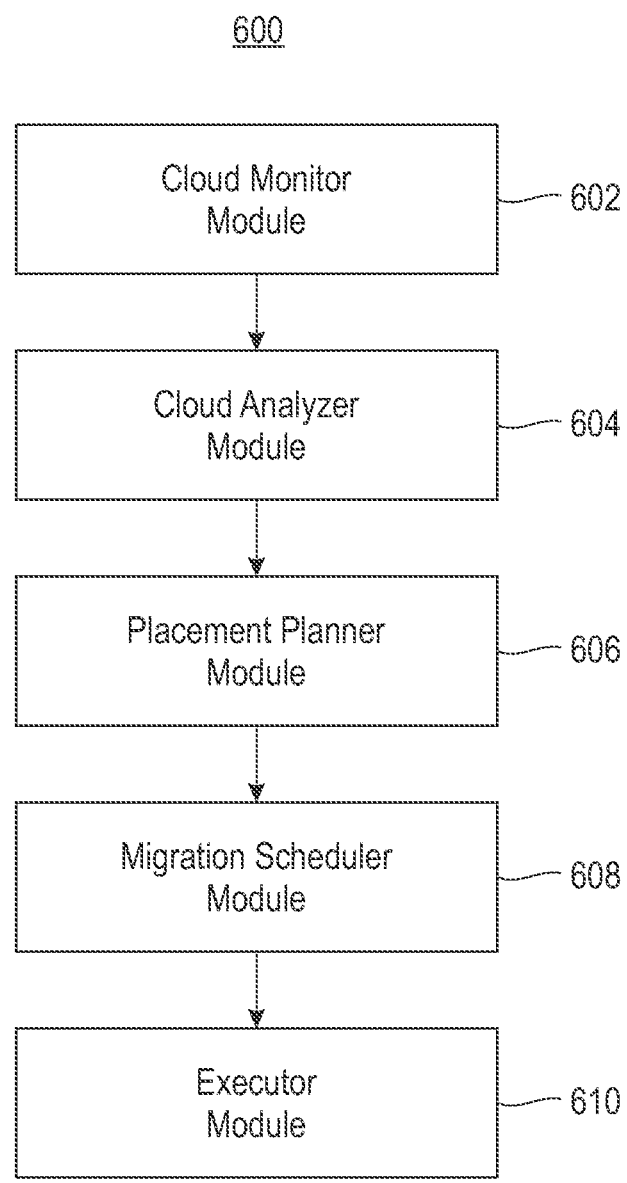
FIG. 6 illustrates an exemplary system for performing virtual machine placement and migration within a cloud computing environment, in accordance with one embodiment.

FIG. 6 illustrates an exemplary system 600 for performing virtual machine placement and migration within a cloud computing environment, in accordance with one embodiment. As shown, the system 600 includes a cloud monitor module 602. In one embodiment, the cloud monitor may monitor new virtual machine requests. For example, a request to add one or more new virtual machines to a cloud computing environment may be received by the cloud monitor module 602. In another embodiment, each new virtual machine request may include one or more parameters.

For example, the one or more parameters may include resource consumption for each new virtual machine to be placed within (e.g., added to, etc.) the cloud computing environment. In another example, the one or more parameters may also include location constraints for one or more of the virtual machines to be placed within the cloud computing environment. In still another example, the one or more parameters may also include a traffic matrix indicating communication traffic or bandwidth requirements between one or more of the virtual machines to be placed within the cloud computing environment.

Additionally, in one embodiment, the cloud monitor may monitor a plurality of data centers within the cloud computing environment. For example, the cloud monitor may monitor a plurality of data centers connected utilizing a backbone network within the cloud computing environment. In another embodiment, the results of the monitoring may include a resource capacity of each data center within the cloud computing environment. In yet another embodiment, the results of the monitoring may include a placement scheme indicating a current placement of all virtual machines within the data centers of the cloud computing environment. In still another embodiment, the results of the monitoring may include a global traffic matrix that indicates communication traffic or bandwidth requirements between one or more of the existing virtual machines within the cloud computing environment.

Further, the cloud monitor module 602 is in communication with a cloud analyzer module 604. In one embodiment, the cloud monitor module 602 may send collected data to the cloud analyzer module 604. For example, the cloud monitor module 602 may send virtual machine requests and associated parameters to the cloud analyzer module 604. In another example, the cloud monitor module 602 may send the results of the monitoring of the plurality of data centers within the cloud computing environment to the cloud analyzer module 604.

Further still, the cloud analyzer module 604 is in communication with a placement planner module 606. In one embodiment, the cloud analyzer module 604 may conditionally send the results of the monitoring of the plurality of data centers within the cloud computing environment to the placement planner module 606. For example, the cloud analyzer module 604 may determine whether a state of the cloud computing environment has changed from a previous state. In another example, the cloud analyzer module 604 may determine whether one or more virtual machines need to be placed within the cloud computing environment.

Also, in one embodiment, the cloud analyzer module 604 may not send the results of the monitoring to the placement planner module 606 in response to a determination by the cloud analyzer module 604 that the state of the system did not change from the previous state, and there are no new virtual machines to be placed within the cloud computing environment. In another embodiment, the cloud analyzer module 604 may send the results of the monitoring to the placement planner module 606 in response to a determination by the cloud analyzer module 604 that the state of the system did change from the previous state, or there are one or more new virtual machines to be placed within the cloud computing environment.

In addition, in one embodiment, the placement planner module 606 may make one or more placement and/or migration decisions based on the data received from the cloud analyzer module 604. For example, based on the data received from the cloud analyzer module 604, the placement planner module 606 may utilize one or more optimization models to find an optimal placement and/or migration plan for new virtual machines to be placed within the cloud computing environment, while minimizing backbone traffic within the cloud computing environment.

Furthermore, the placement planner module 606 is in communication with a migration scheduler module 608. In one embodiment, upon determining that migration of one or more virtual machines is necessary, the placement planner module 606 may send an identification of virtual machines that need to be migrated within the cloud computing environment to the migration scheduler module 608. The migration scheduler module 608 may then utilize a heuristic to determine a migration sequence for the virtual machines to be migrated.

Further still, the migration scheduler module 608 is in communication with an executor module 610. In one embodiment, the migration scheduler module 608 may send an optimal placement of all virtual machines, as well as a determined migration sequence, to the executor module 610 for implementation. In another embodiment, the executor module 610 may execute the placement and/or migration decisions made by the placement planner module 606 and the migration scheduler module 608.

Also, in one embodiment, the execution of the placement may include the provisioning of the virtual machines using an infrastructure as a service (IaaS) manager application program interface (API). In another embodiment, the execution of the migration may follow the migration sequence given by the migration scheduler module 608, and may use the migration mechanisms provided by the IaaS manager. In yet another embodiment, all of the modules 602-610 may be included within a single device. In still another embodiment, the modules 602-610 may be included within a plurality of different devices.

In one embodiment, the cloud computing environment may include an IaaS environment represented by geographically distributed DCs that are interconnected through a backbone network. In such an environment, the cloud provider may not have knowledge about the VMs' demand and the fluctuation of the traffic matrix. The traffic matrix may represent communication traffic or bandwidth requirements between each pair of VMs.

Additionally, in one embodiment, the entire infrastructure including the backbone network may be owned and managed by the same IaaS provider. In this way, it may be desirable to minimize backbone traffic. In another embodiment, each VM may be characterized by its hardware configuration in terms of CPU, RAM and storage. In yet another embodiment, each DC may be characterized by its capacity in terms of hardware resources, CPU, RAM, and storage.

Further, in one embodiment, time may be divided into slots [1 . . . T]. In another embodiment, the metrics characterizing the DCs may be assumed to be constant during each time slot and may be measured at the beginning of each time slot. In another embodiment, each VM may have a location constraint. Thus, the VM may only be placed in a defined set of DCs. In yet another embodiment, there may be multiple independent clients submitting requests to provision VMs that may be heterogeneous and may have both dynamic traffic and location matrices.

Efficient cloud DC management may be a complex task, especially for geographically distributed DCs. Some exemplary factors for such a complexity is the increased number of cloud DCs and the number of VMs. In this context, several decisions may be determined by the cloud manager: (1) Where should each VM be placed while ensuring a proximity location constraint and minimizing the backbone traffic? (2) When is a system reconfiguration needed? (3) Which VMs need to be migrated and to which DCs? (4) If a set of inter-communicating VMs need to be migrated, what is the best migration scheduling of VMs that minimizes the overall traffic circulating in the backbone network?

In order to make the optimal decisions to answer the above questions, a solution may be based on an autonomic management system. Autonomic computing systems may be capable of self-managing themselves by doing self-configuration and self-optimization. Such systems may be able to analyze themselves at runtime, determine their state, and determine a desired state that maintains the QoS.

Problem Formulation

In one embodiment, the dynamic VM placement problem may be defined within a distributed Cloud infrastructure as a MILP model. Table 1 illustrates exemplary notations used in the MILP models. Of course, it should be noted that the notations shown in Table 1 are set forth for illustrative purposes only, and thus should not be construed as limiting in any manner.

TABLE 1

| Symbol | Description |
| --- | --- |
| D | The set of data centers |
| V | The set of virtual machines |
| R | The set of hardware resources (CPU, RAM, storage) |
| $d_{ij}$ | The amount of traffic exchanged between the VM i and the VM j (i ∈ V, j ∈ V) |
| $a_i^k$ | Takes 1 if the VM i can be placed in the DC k, 0 otherwise (i ∈ V, k ∈ D) |
| $cap_r^k$ | The capacity of the DC k in terms of resource r (k ∈ D, r ∈ R) |

TABLE 1-continued

| Symbol | Description |
| --- | --- |
| $u_{ir}$ | The amount of resource r consumed by the VM i ($r \in R$, $i \in V$) |

In one embodiment, the physical infrastructure may be modelled by a complete graph $G(\cup D, E)$, where V denotes the set of VMs and D denotes the set of DCs. The set of edges E represents the set of the backbone network links.

Due to the complexity of the problem, it may be divided into three sub-problems. The first sub-problem may include the initial placement problem, which consists of finding the optimal initial (or first) placement scheme for intercommunicating VMs such as the location and capacity constraints are satisfied and while minimizing the backbone traffic circulating on the backbone network. It may include an offline model that provides a static placement plan.

The second sub-problem may include the dynamic VM placement problem, which may invoke the VM migration as well as the interaction between the initial or the previous placement scheme and the migration decisions. The third sub-problem may include the migration scheduling problem. For example, in order to minimize the traffic circulation on the backbone network during the migration process, a migration sequence for the different intercommunicating VMs may be implemented that minimizes the backbone traffic.

Initial VM Placement Problem

The initial VM placement problem (IVMP) may be seen as a variant of a Hub Location problem, where DCs are considered as hub nodes. First, it may be proven that the IVMP problem is NP-hard. The proof may be based upon a reduction of the IVMP to a capacitated multicommodity flow problem by considering DCs as hubs, where the flows are unsplittable, since each demand node may be assigned to a single DC (hub), then to a single path. The capacities on the DC may be considered as capacities on virtual links by splitting the DCs into two connected virtual nodes. The capacity of this virtual link may be the same capacity of the DC. This problem is known as being NP-hard.

Table 2 illustrates a static placement scheme for different communicating VMs, with an assumption that the future demand is known a priori, in accordance with one embodiment. This formulation may be used to solve the initial placement of VMs in a distributed cloud infrastructure. In this formulation, the following decision variables may be indexed by (0) to indicate the initial (previous) state of the system. Of course, it should be noted that the notations shown in Table 2 are set forth for illustrative purposes only, and thus should not be construed as limiting in any manner.

TABLE 2

We designate by $\varphi_i^{(0)h}$ the amount of traffic originated from the VM $i \in V$ and destined to the DC $h \in D$.
We define the decision variable $x_i^{(0)h}$ as:

$$x_i^{(0)h} = \begin{cases} 1 & \text{If the VM i is placed in the DC h} \\ 0 & \text{Otherwise} \end{cases}$$

We denote by $O_i$ the total traffic emanating from a VM i. We have:

$$O_i = \sum_{j \in V} d_{ij} \quad \forall i \in V \quad (1)$$

TABLE 2-continued

Our objective is to minimize the amount of traffic generated by the communication between different VMs in order to prevent possible link congestion. Hence, the objective function (2) can be defined as follows:

$$\min \sum_{i \in V} \sum_{h \in D} \varphi_i^{(0)h} \quad (2)$$

Subject to the following constraints:

$$\varphi_i^{(0)h} \geq O_i \cdot x_i^{(0)h} - \sum_{j \in V} x_j^{(0)h} \cdot d_{ij} \quad \forall i \in V, \forall h \in D \quad (3)$$

$$\sum_{h \in D} x_i^{(0)h} = 1 \quad \forall i \in V \quad (4)$$

$$\sum_{i \in V} v_{ir} \cdot x_i^{(0)h} \leq cap_r^h \quad \forall r \in R, \forall h \in D \quad (5)$$

$$x_i^{(0)h} \leq a_i^{(0)h} \quad \forall i \in V, \forall h \in D \quad (6)$$

$$\varphi_i^{(0)h} \geq 0 \quad \forall i \in V, \forall h \in D$$

$$x_i^{(0)h} \in \{0, 1\} \quad \forall i \in V, \forall h \in D$$

As shown in Table 2, the constraint (3) may ensures the flow conservation. As for the constraint (4), it may ensure that every VM is running on only one DC. The constraint (5) may represent the capacity constraint on the DCs. It may ensure that the amount of hardware resources consumed by different VMs placed in a given DC do not exceed the hardware capacities of the DC. The final constraint (6) is a location constraint that may restrict the placement of VMs in a particular number of DCs that satisfy a proximity constraint. This constraint may aim to maintain service performance and to reduce time delay by placing VMs with high communication volumes in a proximity of end-users.

This MILP formulation may provide the initial placement scheme of VMs.

Dynamic VM Placement Problem

This problem presents the dynamic version of the VM placement problem in a distributed cloud infrastructure. Because of the fluctuating demand, the placement of different VMs may be adjusted dynamically and in an online manner. Therefore, live migration of VMs may be performed over a Wide Area Network (WAN) that connects different DCs placed in different regions. In fact, VM live migration may offer the ability to migrate VM through WAN from one DC to another. VM live migration may provide higher performance and improve a quality of service.

In one embodiment, WAN VM live migration may generate traffic during the migration process. In another embodiment, for WAN live migration, VM images as well as local persistent states and ingoing network connections may be transferred (e.g., for distributed and intensive input/output applications). Therefore, the minimization of backbone traffic in the migration decisions may be performed.

Additionally, in one embodiment, in a dynamic cloud environment, migration may be performed in different scenarios. For example, two scenarios of VM migration across distributed cloud infrastructure include the arrival or/and departure of VMs, and the change of the traffic matrix.

We model this problem by considering two states of the system: an initial state (refer to the initial (or the previous) placement scheme of the VMs in the cloud system) and the new state (refer to the new configuration of the cloud system, taking into account migration and placement decisions).

Let us consider $V_o$ as the set of VMs that have been already placed in the system, $V_n$ as the set of new arriving VMs, and $V_d$ the set of departing VMs. We denote by $V=(V_o \cup V_n)\backslash V_d$ the set of VMs in the system at a certain time T. This formulation may take as an input the solution of the previous placement problem modeled by $x_i^{(0)h}$ which may refer to the previous location of the VM $i \in V_o$ in the system.

Table 3 illustrates decision variables indexed by (1) to specify the new state of the system, in accordance with one embodiment. Of course, it should be noted that the variables shown in Table 3 are set forth for illustrative purposes only, and thus should not be construed as limiting in any manner.

TABLE 3

We designate by $\varphi_i^{(1)h}$ the amount of traffic originated from the VM $i \in V$ and destined to the DC $h \in D$.
We define the binary decision variable $x_i^{(1)h}$ as follows:

$$x_i^{(1)h} = \begin{cases} 1 & \text{If the VM } i \text{ is placed in the DC } h \\ 0 & \text{Otherwise} \end{cases}$$

To model the migration decision, we introduce the binary decision variable $z_i$ as follows:

$$z_i = \begin{cases} 1 & \text{If the VM } i \in V_o \text{ and } i \text{ is migrated} \\ 0 & \text{Otherwise} \end{cases}$$

One objective of the formulation in Table 3 is to minimize the traffic on the backbone network. For example, the sum of the traffic generated by the communication between VMs may be considered, as well as the traffic generated during the migration process. The migration decision may concern only the VMs ($i \in V_o$) that are already placed in the cloud system.

In one embodiment, $Mig_i$ may represent an amount of traffic generated by the migration of the VM $i \in V_o$. In WAN migration, the migration traffic may be defined as a function of the memory size of the VM and its local disk size.

Table 4 illustrates an objective function (7) that minimizes the amount of traffic circulating on the backbone network which is constituted by communication traffic and the traffic generated during migration, in accordance with one embodiment. Of course, it should be noted that the function shown in Table 4 is set forth for illustrative purposes only, and thus should not be construed as limiting in any manner.

TABLE 4

$$\min \sum_{i \in V} \sum_{h \in D} Mig_i \cdot z_i + \varphi_i^{(1)h} \quad (7)$$

Subject to the following constraints:

$$z_i \geq |x_i^{(1)h} - x_i^{(0)h}| \quad \forall i \in V, \forall h \in D \quad (8)$$

$$\varphi_i^{(1)h} \geq O_i \cdot x_i^{(1)h} - \sum_{j \in V} x_j^{(1)h} \cdot d_{ij} \quad \forall i \in V, \forall h \in D \quad (9)$$

$$\sum_{h \in D} x_i^{(1)h} = 1 \quad \forall i \in V \quad (10)$$

$$\sum_{i \in V} v_{ir} \cdot x_i^{(1)h} \leq cap_r^h \quad \forall r \in R, \forall h \in D \quad (11)$$

$$x_i^{(1)h} \leq a_i^{(1)h} \quad \forall i \in V, \forall h \in D \quad (12)$$

$$\varphi_i^{(1)h} \geq 0 \quad \forall i \in V$$

$$x_i^{(1)h} \in \{0, 1\} \quad \forall i \in V, \forall h \in D$$

$$z_i \in \{0, 1\} \quad \forall i \in V_o$$

If a VM is migrated, its old location is different from its new one. This fact may be modeled by the set of constraints (8). Constraint (9) may include a flow conservation constraint. Constraint (10) may ensure that a VM is running on only one DC. The capacity constraint on the DCs may be ensured by the constraint (11). Constraint (12) may refer to the proximity location constraint.

This model may provide an optimal migration and placement scheme for different VMs that may minimize the backbone traffic constituted by both communication and migration traffic.

VM Migration Scheduling Problem

In one embodiment, the migration order of inter-communicating VMs may have an influence on the backbone traffic. For example, the migration of inter-communicating VMs over the backbone network may lead to an increase of the traffic on the network links. Therefore, migration scheduling of VMs may be determined that minimizes the communication traffic in the backbone network.

An effective migration scheduling of VMs may prevent network link congestion and may maintain the performance of both VMs in the source and destination as well as the migrating VM. For example, assume that some VMs, corresponding to the nonzero values of the variables $x_i=1$, that must be moved from the DC h ($x_i^{(0)h}=1$) to the DC k ($x_i^{(1)k}=1$). These VMs exchanged data flows given by the elements $d_{ij}$ of the traffic matrix. At each step of the migration process, there may be a certain amount of data traffic exchanged between the two DCs between which the migration is performed. The volume of this traffic may depend on the migration order of the VMs.

Figure 7:
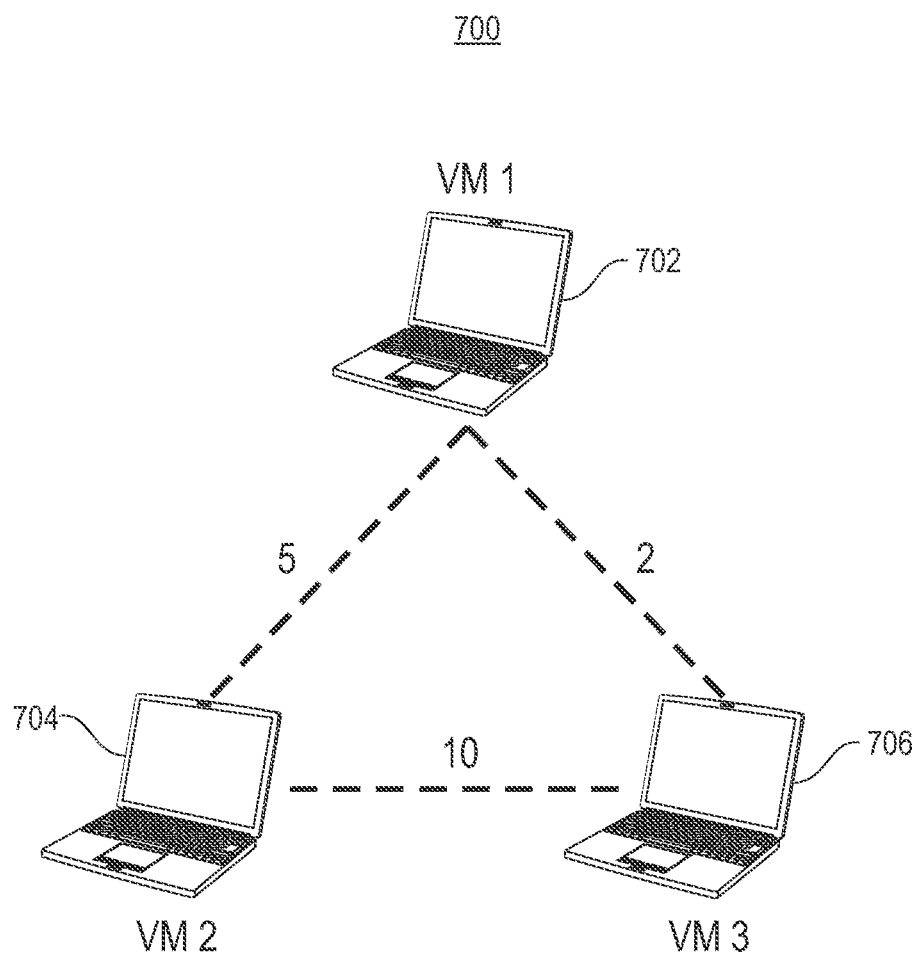
FIG. 7 illustrates an exemplary virtual machine network, in accordance with one embodiment.
Figure 8:
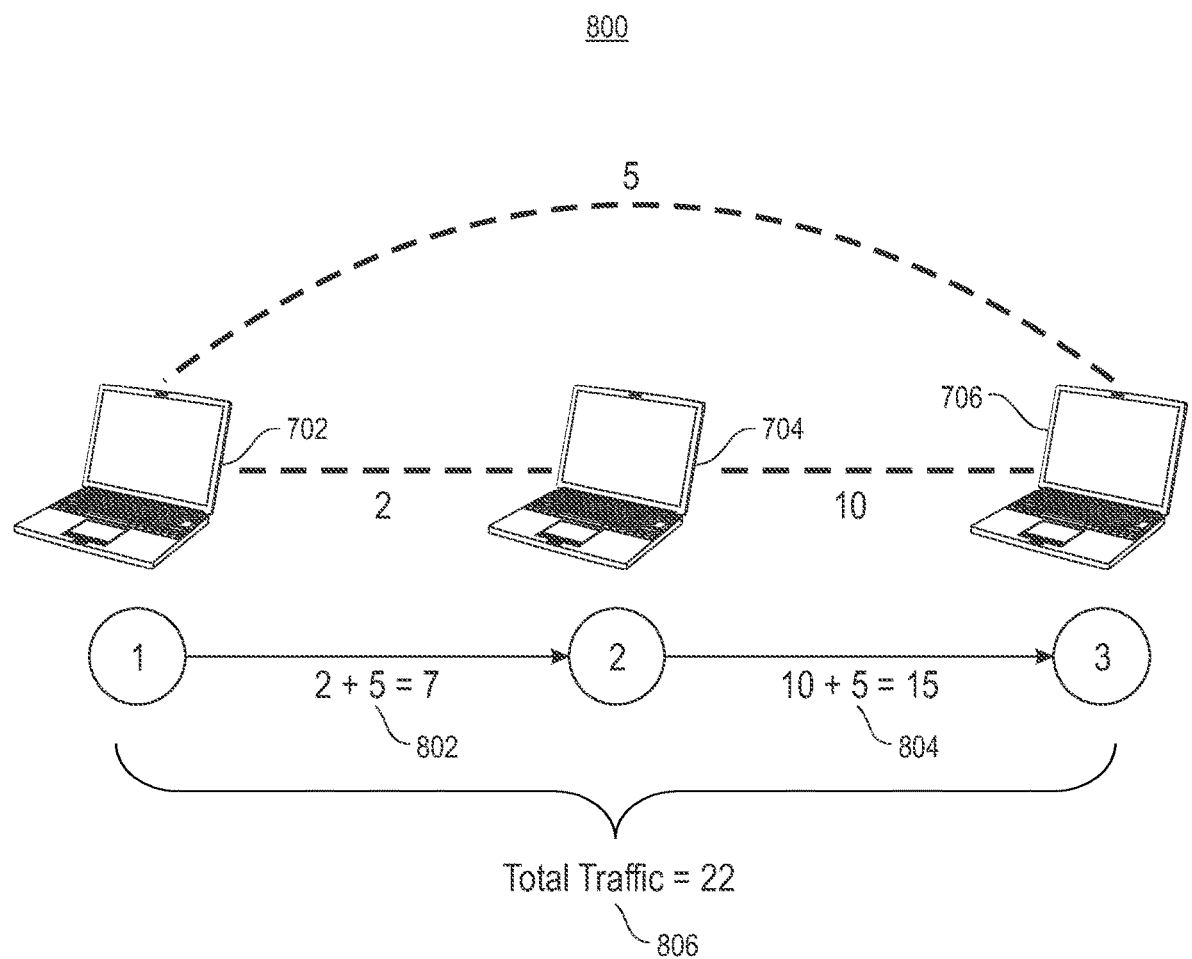
FIG. 8 illustrates an exemplary order of migration for virtual machines within a network, in accordance with one embodiment.

For instance, assume the three VMs network 700 depicted in FIG. 7. As illustrated in FIG. 8, a first order of migration 800 may be 1-2-3 (e.g., migrating a first VM 702, a second VM 704, and a third VM 706 in that order). By moving the first VM 702, the traffic 802 is equal to 7, and then the traffic 804 raises to 15 after migrating the third VM 706, and the total traffic 806 becomes 15+7=22. Finally, the third VM 706 is moved.

Figure 9:
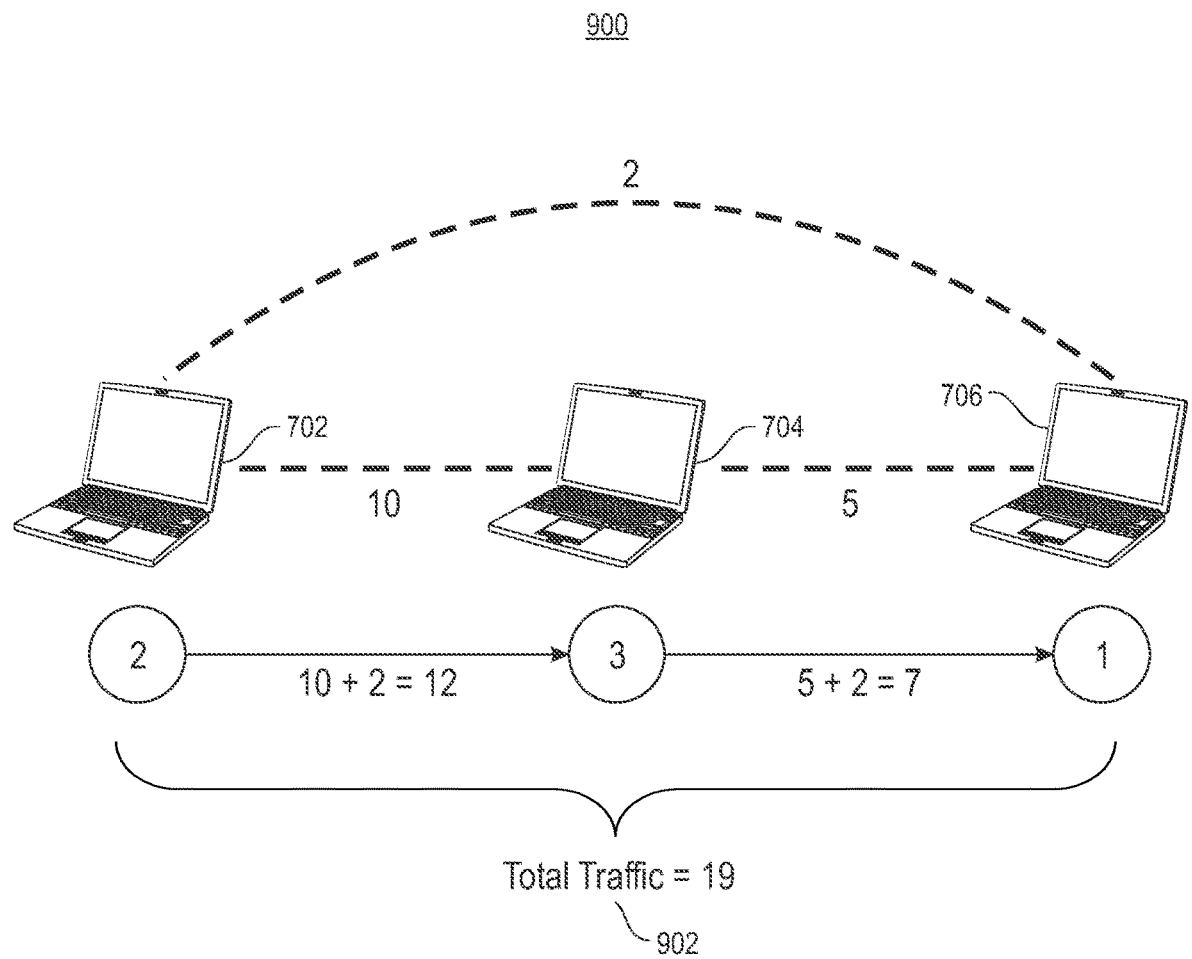
FIG. 9 illustrates another exemplary order of migration for virtual machines within a network, in accordance with one embodiment.

In another example, as depicted in FIG. 9, when considering the migration order 900 of 2-3-1 (e.g., migrating the second VM 704, the third VM 706, and the first VM 702 in that order), the total flow 902 is 19, which may be an improvement over the migration order 800 in FIG. 8.

In such a linear network, there may be one path for the flow between each pair of VMs. The total traffic engaged in the network may be the sum of the products of the amounts of flow between each pair of VMs by the lengths of each path expressed in number of hops. Consequently, obtaining a minimum value of the total traffic may consist of finding a Hamiltonian cycle of minimum value spanning all the VMs to be migrated.

The migration scheduling problem may be decomposed by pairs of DCs, which may reduce its complexity. Ordering DC pairs may have no influence on the value of the total flow due to the migration process and the injection into the backbone network.

In one embodiment, a total traffic caused by the migration scheduling may be independent of the data centers pairs ordering. Table 5 illustrates a proof validating this proposition, in accordance with one embodiment. Of course, it should be noted that the proof shown in Table 5 is set forth for illustrative purposes only, and thus should not be construed as limiting in any manner.

TABLE 5

Proof. At any step of the migration process, we denote by $x_i^h = 1$ if the VM remains connected to the DC h. It takes the value 0 otherwise. The data traffic injected to the backbone network and caused by the migration process can be written by the following $$\min \sum_{i \in V} \sum_{j \in V} \sum_{h \in D} \sum_{k \in D} d_{ij} x_i^h x_j^k \quad (13)$$

Subject to:

$$\sum_{h \in D} x_i^h = 1, \forall i \in V. \quad (14)$$

But from (14), we obtain:

$$x_i^k + \sum_{h \neq k} x_i^h = 1, \forall i \in V. \quad (15)$$

After replacing (15) in (13), we have:

$$z = \sum_{i \in V} \sum_{j \in V} \sum_{h \in D} d_{ij} x_i^h (1 - x_j^h) \quad (16)$$

From the new form of the expression (13) presented in equation (16), we deduce that the total traffic due to the migration process does not depend on the DC pairs, thus, independent from DC pairs ordering. □

Consequently, the migration scheduling problem may also be independent from the DC pair ordering and may be considered by DC pairs separately. This problem may be seen as a variant of the traveling salesman problem, where the objective is the minimum traffic in the backbone network.

One exemplary formulation for the TSP problem may provide a polynomial number of constraints and have $O(n^2)$ variables. In this formulation, an undirected complete graph G=(M,E) may be given, where M=N∪{0} denotes the set of VMs that will be migrated and E denotes the set of edges. Since there is no specified starting VM to migrate, a dummy node 0 may be added which refers to a starting point of the migration sequence. This particular node may not exchange flow with other nodes. The optimal sequence may be obtained by omitting this extra node. The amount of traffic exchanged between each pair of VMs that will be migrated is denoted by $c_{ij}$.

Table 6 illustrates decision variables for the exemplary formulation, in accordance with one embodiment. Of course, it should be noted that the decision variables shown in Table 6 are set forth for illustrative purposes only, and thus should not be construed as limiting in any manner.

TABLE 6

$u_i$ designates the position of the VM $i \in M$ in the migration sequence.
$y_{ij}$ is a binary decision defined as follows.

$$y_{ij} = \begin{cases} 1 & \text{If the link (i, j) belongs to the tour} \\ 0 & \text{Otherwise} \end{cases}$$

In one embodiment, the decision variable $w_{ij} \geq 0$ may be defined as the distance between VMs i and j.

Table 7 illustrates the objective function for the exemplary formulation, in accordance with one embodiment. Of course, it should be noted that the objective function shown in Table 7 is set forth for illustrative purposes only, and thus should not be construed as limiting in any manner.

TABLE 7

$$\min \sum_{i \in N} \sum_{j \in N} w_{ij} \cdot c_{ij} \quad (17)$$

Subject to:

$$w_{ij} \geq u_i - u_j \qquad \forall i, j \in M \quad (18)$$
$$w_{ij} \geq u_j - u_i \qquad \forall i, j \in M \quad (19)$$
$$\sum_{\substack{j \in M \\ i \neq j}} y_{ij} = 1 \qquad \forall i \in M \quad (20)$$
$$\sum_{\substack{j \in M \\ i \neq j}} y_{ij} = 1 \qquad \forall i \in M \quad (21)$$
$$u_i - u_j + n \cdot y_{ij} + (n-2) \cdot y_{ji} \leq n-1 \qquad \forall i \in N, \forall j \neq i \in N \quad (22)$$
$$1 + (n-2) \cdot y_{i0} + \sum_{j \in N} y_{ji} \leq u_i \qquad \forall i \in N \quad (23)$$
$$n - (n-2) \cdot y_{0i} - \sum_{j \in N} y_{ij} \geq u_i \qquad \forall i \in N \quad (24)$$
$$y_{ij} \in \{0, 1\} \qquad \forall i \in M, \forall j \in M$$
$$w_{ij} \geq 0 \qquad \forall i \in M, \forall j \in M$$

The objective function (17) may minimize the overall backbone traffic due to the migration of intercommunicating VMs. The constraints (18) and (19) may ensure that the distance between the VMs i and j corresponds to the difference of their respective positions. The set of constraints (20) and (21) may ensure that each node (VM) is migrated exactly once. Constraint (22) may ensure the elimination of subtours and may guarantee a linear arrangement representing the migration order. Constraints (23) and (24) may eliminate tours that serve more or less than exactly n VM nodes. The order of migration may be directly obtained from the solution to the problem above by eliminating the added virtual node 0 and its arcs.

In one embodiment, The VM migration scheduling (VMMS) problem may be NP-Hard. This may be proven based upon reduction of the VMMS problem to the traveling salesman problem (TSP). The TSP is known as being NP-complete, so the VM migration scheduling problem is NP-Hard.

In one embodiment, a heuristic described in the algorithm (1) from Table 2 may exploit the transformation of the problem to the TSP. The underlying idea of the heuristic is to consider the migration process as a network flow problem where the objective function minimizes the total flow on the links. This network may have a linear topology (to be determined) that represents the scheduling of the migration process of the VMs. The load on each link is made up of the transiting traffic through it and the entering/exiting traffic from/to its end nodes.

Therefore, the VMs may be arranged in such a manner that the heaviest flows are routed on the direct links. For example, the TSP may be transformed to a maximization problem (TSPMax) in order to route the heaviest traffic on the direct links.

Then, the heuristic may include solving a TSP with a maximization objective function rather than minimization, where the link weights are represented by the amount of flow exchanged between their end nodes. With such an objective function, TSP may be solved.

Table 8 illustrates an exemplary TSPMax objective function, in accordance with one embodiment. Of course, it should be noted that the objective function shown in Table 8 is set forth for illustrative purposes only, and thus should not be construed as limiting in any manner.

TABLE 8

$$\max \sum_{i \in N} \sum_{\substack{j \in N \\ i \neq j}} y_{ij} \cdot c_{ij} \quad (25)$$

Subject to:

$$\sum_{\substack{j \in N \\ i \neq j}} y_{ij} = 1 \quad \forall i \in N \quad (26)$$

$$\sum_{\substack{j \in N \\ i \neq j}} y_{ji} = 1 \quad \forall i \in N \quad (27)$$

$$u_i - u_j + (n-1) \cdot y_{ij} + (n-3) \cdot y_{ji} \leq n-2 \quad \forall i \neq 1 \in N, \forall j \neq 1 \in N \quad (28)$$

$$1 + (n-3) \cdot y_{i1} + \sum_{\substack{j \in N \\ j \neq 1}} y_{ji} \leq u_i \quad \forall i \neq 1 \in N \quad (29)$$

$$n - 1 - (n-3) \cdot y_{1i} - \sum_{\substack{j \in N \\ j \neq 1}} y_{ij} \geq u_i \quad \forall i \neq 1 \in N \quad (30)$$

$$y_{ij} \in \{0, 1\} \quad \forall i \in N, \forall j \in N$$

As shown in Table 8, the objective function (25) may prioritize the migration of VMs that are highly correlated and are exchanging an important amount of traffic. The set of constraints (26) and (27) may ensure that each node (VM) is migrated exactly once. Constraint (28) may ensure the elimination of the subtours. Constraints (30) and (29) may eliminate tours that serve more or less than exactly n VM nodes.

Table 9 illustrates an exemplary VM migration scheduling algorithm, in accordance with one embodiment. Let $f_{ij}$ be the total flow circulating between the node i and j ($i \in N$, $j \in N$). Of course, it should be noted that the algorithm shown in Table 9 is set forth for illustrative purposes only, and thus should not be construed as limiting in any manner.

TABLE 9

Input: Number of VMs to migrate N, traffic matrix
Output: The best migration sequence
1: Initialize $u_1 = 1$
2: Solve the TSPMax problem
3: Get the values of the variables $u_i$ and $y_{ij}$ from the solution of the TSPMax
4: repeat
5:  Eliminate an arc from the solution cycle. Let ($i_0, j_0$) be that arc
6:  Calculate the total flow
    $f_{i_0 j_0} = \Sigma_{i \in N} \Sigma_{j \in N} |u_j - u_i| \times c_{ij}$
7:  Recover the arc ($i_0, j_0$) to the solution
8: until All arcs have been removed once
9: Find $f_{i_b j_b} = \inf_{(i,j)} (f_{ij})$
10: The best migration sequence is the sequence obtained by eliminating the arc ($i_b, j_b$).

In this way, the problem of dynamic VM placement in a geographically distributed cloud infrastructure may be addressed. The reconfiguration of the VM placement plan may be implemented dynamically over time with the objective of minimizing the inter-DC network traffic. This reconfiguration may be based on mathematical methods that provide the optimal placement and migration scheme for the VMs in different DCs. The needed VM migration may be scheduled, and a heuristic may be proposed that aims to find the best schedule for intercommunicating VMs such that the entire backbone traffic is minimized.

Additionally, the VM dynamic placement problem may be characterized as an autonomic management system scheme. The initial (static) and the subsequent VM placement (dynamic) in geographically distributed DCs may be defined as mixed integer linear programming (MILP) formulations with the objective of minimizing inter-DC traffic. Capacity constraints on DCs as well as proximity location constraints for VMs may be considered. The migration scheduling problem for inter-communicating VMs may be defined, and a heuristic may be provided to solve it. The aim of this heuristic may be to select the best migration sequence of inter-communication VMs while minimizing the entire backbone traffic. A proof of NP-hardness of this problem may be provided, and the effusiveness of the heuristic may be demonstrated.

The present work is different from traditional VM placement proposals since it considers joint VM placement and migration with resource allocation and traffic demand satisfaction across a geographically distributed cloud infrastructure while ensuring QoS and proximity location to end users. In addition, it addresses the problem of the dynamic traffic-aware VM placement problem while ensuring the minimization of both communication and migration traffic.

Furthermore, the problem of VM migration scheduling is addressed by finding a migration sequence for inter-communicating VMs while ensuring the minimum backbone traffic. In this way, the VM migration scheduling problem may be addressed within geographically distributed DCs with the objective of minimizing backbone traffic.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A computer-implemented method, comprising:
identifying a set of virtual machines to be placed within a system, the system including a cloud-based storage network including a plurality of data centers that are each located in different geographical locations and that are connected utilizing a backbone network;

receiving characteristics associated with the set of virtual machines, the characteristics including:
- resource utilization for the set of virtual machines, the resource utilization including central processing unit (CPU) utilization for each virtual machine of the set of virtual machines, random access memory (RAM) utilization for each virtual machine of the set of virtual machines, storage utilization for each virtual machine of the set of virtual machines, and network utilization for each virtual machine of the set of virtual machines,
- a maximum latency allowed by each of the set of virtual machines,
- limitations on a physical location where each of the set of virtual machines may be physically stored, and
- a traffic matrix describing network traffic that occurs between each virtual machine within the set of virtual machines;

determining characteristics associated with a current state of the system, the characteristics including:
- a capacity of each of the plurality of data centers within the system, including a listing of available CPU resources, RAM resources, and storage resources at each of the plurality of data centers within the system,
- a current utilization of the capacity of each of the plurality of data centers by virtual machines currently placed within the system,
- a current placement within one or more data centers of the virtual machines currently placed within the system,
- a global traffic matrix describing network traffic that occurs between all the virtual machines currently placed within the system;

determining a placement of the set of virtual machines within the system, based on the characteristics associated with the set of virtual machines and the characteristics associated with a current state of the system, where the placement includes a location within the system where each of the set of virtual machines is to be placed that minimizes an amount of communication traffic on the backbone network, while still enabling the characteristics associated with the set of virtual machines;

determining an updated placement of all virtual machines currently placed within the system, based on the characteristics associated with the set of virtual machines and the characteristics associated with a current state of the system;

determining a migration sequence within the system in order to implement the updated placement of all virtual machines currently placed within the system, where the migration sequence is determined utilizing a linear optimization model and indicates an order of movements of all virtual machines currently placed within the system from one data center within the system to another data center within the system that minimizes communication traffic within the backbone network while implementing the updated placement of all virtual machines currently placed within the system; and implementing the updated placement, utilizing the migration sequence.

2. The computer-implemented method of claim 1, wherein the linear optimization model includes a path for a flow between each virtual machine, where a total network traffic includes a sum of products of amounts of flow between each pair of virtual machines by lengths of each path expressed in a number of hops, and a minimum value of total traffic is obtained by finding a Hamiltonian cycle of minimum value spanning all virtual machines to be migrated.

3. The computer-implemented method of claim 1, wherein the migration sequence is implemented using migration mechanisms provided by an infrastructure as a service (IaaS) manager.

4. The computer-implemented method of claim 1, wherein the placement of the set of virtual machines within the system, the updated placement of all virtual machines currently placed within the system, and the migration sequence are all determined simultaneously.

5. The computer-implemented method of claim 1, wherein the placement of the set of virtual machines within the system and the updated placement of all virtual machines currently placed within the system are optimized utilizing one or more optimization models.

6. The computer-implemented method of claim 1, wherein the placement of the set of virtual machines within the system is performed using an infrastructure as a service (IaaS) manager application program interface (API).

7. The computer-implemented method of claim 1, wherein the system includes an infrastructure as a system (IaaS) that provides virtualized computing resources.

8. A computer program product for optimal dynamic virtual machine placement in geographically distributed cloud data centers, the computer program product comprising a computer readable storage medium having program instructions embodied therewith, wherein the computer readable storage medium is not a transitory signal per se, the program instructions executable by a processor to cause the processor to perform a method comprising:

identifying a set of virtual machines to be placed within a system, utilizing the processor the system including a cloud-based storage network including a plurality of data centers that are each located in different geographical locations and that are connected utilizing a backbone network;

receiving characteristics associated with the set of virtual machines, utilizing the processor, the characteristics including:
- resource utilization for the set of virtual machines, the resource utilization including central processing unit (CPU) utilization for each virtual machine of the set of virtual machines, random access memory (RAM) utilization for each virtual machine of the set of virtual machines, storage utilization for each virtual machine of the set of virtual machines, and network utilization for each virtual machine of the set of virtual machines,
- a maximum latency allowed by each of the set of virtual machines,
- limitations on a physical location where each of the set of virtual machines may be physically stored, and
- a traffic matrix describing network traffic that occurs between each virtual machine within the set of virtual machines;

determining characteristics associated with a current state of the system, utilizing the processor, the characteristics including:
- a capacity of each of the plurality of data centers within the system, including a listing of available CPU resources, RAM resources, and storage resources at each of the plurality of data centers within the system, a current utilization of the capacity of each of the plurality of data centers by virtual machines currently placed within the system, a current placement within one or more data centers of the virtual machines currently placed within the system, a global traffic matrix describing network traffic that occurs between all the virtual machines currently placed within the system;

determining a placement of the set of virtual machines within the system, based on the characteristics associated with the set of virtual machines and the characteristics associated with a current state of the system, utilizing the processor, where the placement includes a location within the system where each of the set of virtual machines is to be placed that minimizes an amount of communication traffic on the backbone network, while still enabling the characteristics associated with the set of virtual machines;

determining an updated placement of all virtual machines currently placed within the system, based on the characteristics associated with the set of virtual machines and the characteristics associated with a current state of the system, utilizing the processor;

determining a migration sequence within the system in order to implement the updated placement of all virtual machines currently placed within the system, utilizing the processor where the migration sequence is determined utilizing a linear optimization model and indicates an order of movements of all virtual machines currently placed within the system from one data center within the system to another data center within the system that minimizes communication traffic within the backbone network while implementing the updated placement of all virtual machines currently placed within the system; and implementing, utilizing the processor, the updated placement, utilizing the migration sequence.

9. The computer program product of claim 8, wherein the migration sequence is implemented using migration mechanisms provided by an infrastructure as a service (IaaS) manager.

10. The computer program product of claim 8, wherein the placement of the set of virtual machines within the system, the updated placement of all virtual machines currently placed within the system, and the migration sequence are all determined simultaneously, utilizing the processor.

11. The computer program product of claim 8, wherein the placement of the set of virtual machines within the system and the updated placement of all virtual machines currently placed within the system are optimized utilizing one or more optimization models.

12. The computer program product of claim 8, wherein the placement of the set of virtual machines within the system is performed using an infrastructure as a service (IaaS) manager application program interface (API).

13. A system, comprising:
a processor; and
logic integrated with the processor, executable by the processor, or integrated with and executable by the processor, the logic being configured to:
identify a set of virtual machines to be placed within a system, the system including a cloud-based storage network including a plurality of data centers that are each located in different geographical locations and that are connected utilizing a backbone network;

receive characteristics associated with the set of virtual machines, the characteristics including:
resource utilization for the set of virtual machines, the resource utilization including central processing unit (CPU) utilization for each virtual machine of the set of virtual machines, random access memory (RAM) utilization for each virtual machine of the set of virtual machines, storage utilization for each virtual machine of the set of virtual machines, and network utilization for each virtual machine of the set of virtual machines, a maximum latency allowed by each of the set of virtual machines, limitations on a physical location where each of the set of virtual machines may be physically stored, and a traffic matrix describing network traffic that occurs between each virtual machine within the set of virtual machines;

determine characteristics associated with a current state of the system, the characteristics including:
a capacity of each of the plurality of data centers within the system, including a listing of available CPU resources, RAM resources, and storage resources at each of the plurality of data centers within the system, a current utilization of the capacity of each of the plurality of data centers by virtual machines currently placed within the system, a current placement within one or more data centers of the virtual machines currently placed within the system, a global traffic matrix describing network traffic that occurs between all the virtual machines currently placed within the system;

determine a placement of the set of virtual machines within the system, based on the characteristics associated with the set of virtual machines and the characteristics associated with a current state of the system, where the placement includes a location within the system where each of the set of virtual machines is to be placed that minimizes an amount of communication traffic on the backbone network, while still enabling the characteristics associated with the set of virtual machines;

determine an updated placement of all virtual machines currently placed within the system, based on the characteristics associated with the set of virtual machines and the characteristics associated with a current state of the system;

determine a migration sequence within the system in order to implement the updated placement of all virtual machines currently placed within the system, where the migration sequence is determined utilizing a linear optimization model and indicates an order of movements of all virtual machines currently placed within the system from one data center within the system to another data center within the system that minimizes communication traffic within the backbone network while implementing the updated placement of all virtual machines currently placed within the system; and implement the updated placement, utilizing the migration sequence.

* * * * *